United States Patent [19]

Tuman

[11] 4,116,326

[45] Sep. 26, 1978

[54] VIBRATING CONVEYOR BAR CLEANING SYSTEM

[76] Inventor: David B. Tuman, Rte. 2, Box 2432, Stimpson Rd., Oroville, Calif. 95965

[21] Appl. No.: 806,667

[22] Filed: Jun. 15, 1977

[51] Int. Cl.² .......................................... B65G 45/00
[52] U.S. Cl. .................................... 198/498; 198/752; 209/387
[58] Field of Search .............. 198/494, 497, 498, 752, 198/774; 209/322, 379, 385, 387, 389

[56] References Cited

U.S. PATENT DOCUMENTS

| 784,584 | 3/1905 | Myers | 209/387 |
| 3,444,028 | 3/1969 | Belfield et al. | 198/498 |

Primary Examiner—Bruce H. Stoner, Jr.
Assistant Examiner—Jeffrey V. Nase
Attorney, Agent, or Firm—Blair, Brown & Kreten

[57] ABSTRACT

The invention relates to a system which automatically cleans the grates or bars on a vibrating bark, sawdust and material conveyor. It does this by moving the teeth which are disposed on an oscillating cleaner back and forth from the bottom side of the grate or bar network in a raking action. It changes direction automatically at each end of travel.

7 Claims, 5 Drawing Figures

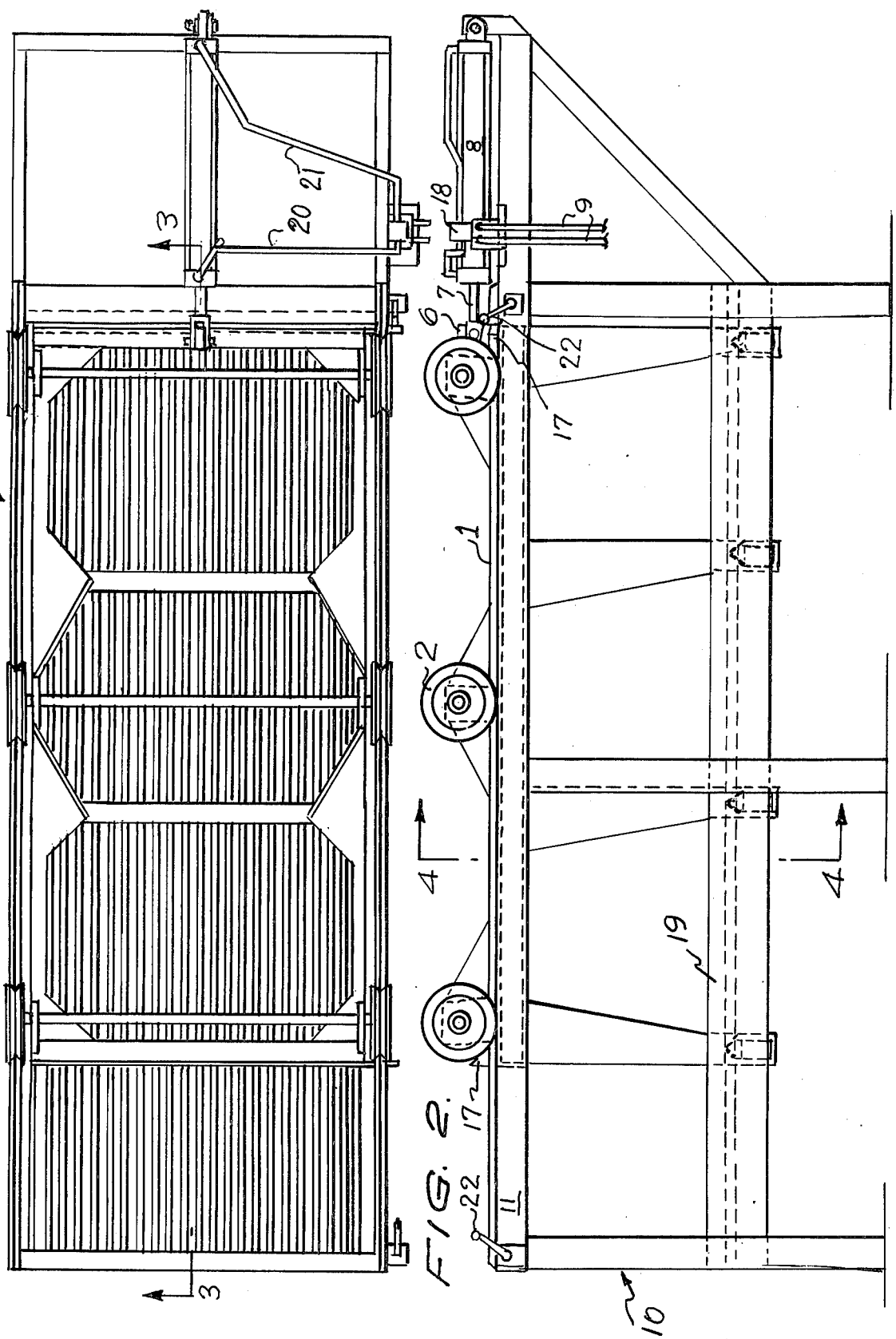

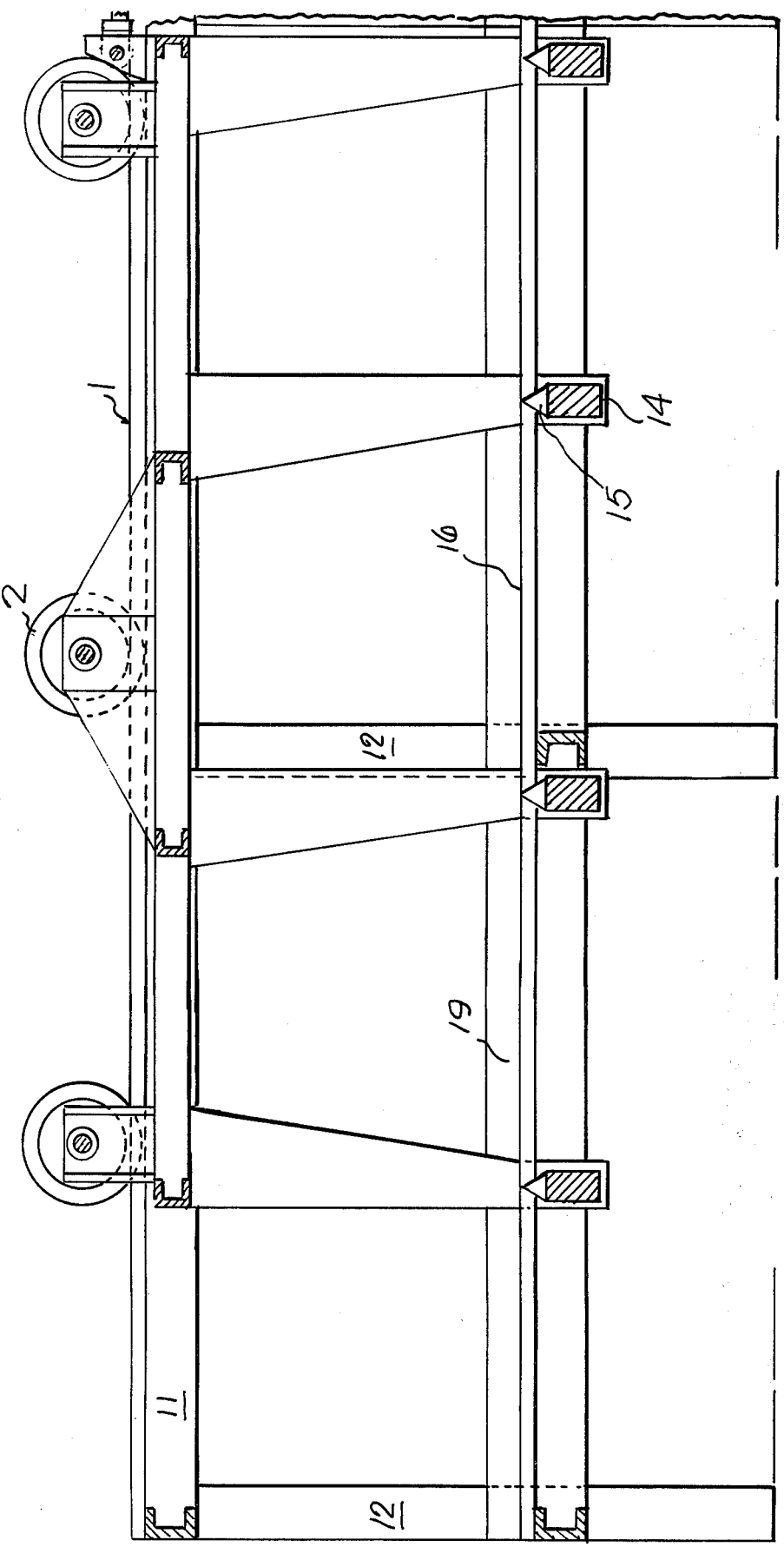

VIBRATING CONVEYOR BAR CLEANING SYSTEM

BACKGROUND OF THE INVENTION

Field of the Invention

Conveyors which translate objects disposed thereon by vibration have been known for some time. However in the case of vibratory conveyors which are used to transport pieces of bark, sawdust and material, the efficiency of the system has been traditionally impaired by having pieces of bark or other materials become entrained between the bars or grates of the vibrating system. These bars or grates can generally be considered as being parallel, and all have the same physical configuration and horizontal extent.

As the bark or other material is being vibrated across these bars, certain portions of the bark or material will become lodged between these bars which restrict the free flow of material along the conveyor and also limits or prevents the fines or smaller particals from dropping out thus contaminating the product. One of the prime objectives of this device is to get rid of the fines and small material, or to divert the material.

SUMMARY OF THE INVENTION

Accordingly the following invention describes a means by which the entrained pieces of bark or other material is systematically and continuously removed from the areas between the bar network, thereby making more efficient the conveying process. This is achieved by providing teeth which traverse the areas between the grates for the full horizontal extent of these vibratory grates, to remove the entrained pieces of bark or other material, thereby making the vibratory conveyor more effective.

OBJECT OF THE INVENTION

It is therefore an object of the invention to provide a means by which the entrained pieces of bark or other materials between the grates in a vibratory conveyor can be freed to enhence the efficiency of a vibratory conveyor. It is a further object to provide a means for improving the efficiency of a vibrating conveyor by keeping the area between the vibrating grates clear so as to increase the carrying capacity of the conveyor and to clean the material as it vibrates across the grates.

These and other objects will become apparent when considering the following drawings and specification.

DESCRIPTION OF THE DRAWINGS

FIG. 1 shows a top plan view of the vibrating conveyor bar cleaning system;

FIG. 2 is a side view of said system;

FIG. 3 is a sectional view taken along the lines 3—3 of FIG. 1;

DESCRIPTION OF THE PREFERRED EMBODIMENT

Figure 4:
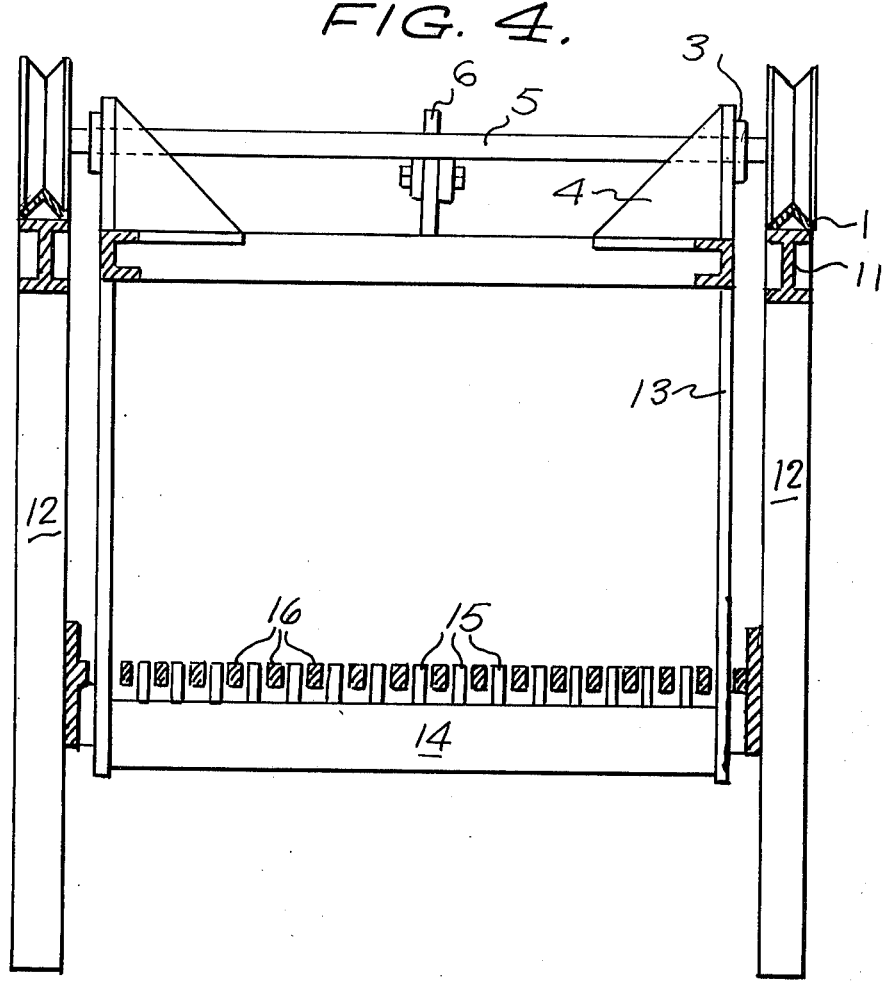
FIG. 4 is a sectional view taken along the lines 4—4 of FIG. 2.

Referring to the drawings now, in which like numerals refer to like parts throughout the drawings, reference numeral 10 generally denotes the vibrating conveyor bar cleaning system.

FIGS. 2 and 3 perhaps best depict the areas of interest in this cleaning system. Displayed therein it will be noted that the frame members generally denoted by numerals 11, 12 and 19 serve as the carriage frame upon which the bars 16 are deployed. The top frame member 11 of the carriage frame assembly have disposed thereon a trackway indicated by numeral 1 upon which the carriage assembly rolls as at wheels 2.

Figure 5:
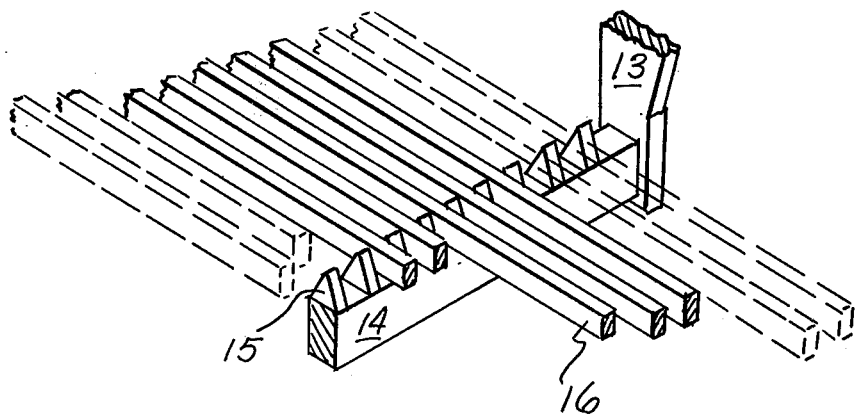
FIG. 5 is a detailed depiction of the effect of the cleaning teeth on the grate network.

The wheels of the carriage assembly are carried on axle members 5 which are supporting the carriage itself through bearings 3 and frame members 4 and 13 as seen in FIG. 4. The bottom cross bar of the carriage itself as denoted by numeral 14 provides the support for generally upstanding teeth members 15 which ride between the grate of so called bars 16 to provide the cleaning effect. FIG. 5 best depicts the interaction of the teeth 15 with the bars in which it will be observed that bark and other materials which become entrained between the adjacent bars 16 will become freed upon interaction with the teeth members 15.

The carriage while resting on wheels 2 disposed on track 1 of the carriage frame assembly is capable of oscillatory horizontal motion by means of mechanism denoted by numerals 6, 7, 8, 9 and 18 on the righthand portion of FIG. 2. Element 6 provides the means by which the carriage is fastened to rod member 7 which reciprocates in cylinder 8 by means of a motor force provided through lines 9 as at 18. 18 can generally be regarded as a motor which has lines 20 and 21 communicating with the cylinder 8 to provide the reciprocal motion of the carriage. Lines 20 and 21 are respectively designated as intake and outlet lines and their respective uses determines whether the rod 7 is reciprocating in or out of the cylinder 8. Lines 9 are connected to left and right hand limit stops denoted by numerals 17 of FIG. 2 and this provides the reversing effect by providing a suitable signal to the motor 18 which is hooked up to a power source (not shown). The actuation of the motor can take any of a number of widely known actuation means: that is to say it may be a hydraulic fluid pump, an air pump, or an electrical motor. The determination of which mechanism is to be used is of course a function of the load requirements of the system.

Handle elements 22, disposed at the extremity of the carriage frame, provide a fail-safe type of stop mechanism for insuring that the carriage itself will be retained on the trackway in the event that limit switches 17 become inoperative or are inadvertently displaced. These handle members are operatively connected to the power source of the motor, and therefore act as a secondary stop means to disengage the motor 18.

In operation then it is seen perhaps best in FIG. 4 how the carriage assembly oscillates in a horizontal sence back and forth in which the teeth 15 of the carriage ride in the interstices of the bars 16, thereby freeing entrained bark and allowing the vibratory bars to work more efficiently.

Having thus described the preferred embodiment of the invention it should be understood that numerous structural modifications and adaptations may be resorted to without departing from the spirit of the invention.

What is claimed is:

1. A vibrating conveyor bar cleaning system comprising a carriage frame having a top portion and vertical legs supporting said top portion, a carriage slidably disposed on said carriage frame top portion having depending frame elements inwardly disposed relative to said vertical legs of said carriage frame; said frame elements terminate in a transverse cross bar at the extremity remote from said top portion of said carriage frame, a plurality of parallel substantially horizontally disposed bars capable of vibratory motion, said bars being spaced from each other by a uniform distance and disposed below the top portion of said carriage frame, teeth members carried by said carriage by said transverse cross bar upwardly extending into the areas between said parallel bars to remove bits of matter entrained between said bars, and means for imparting a horizontally reciprocating motion to said carriage, whereby said teeth disposed on said carriage will traverse substantially the entire length of said vibratory bars, thereby removing entrained matter disposed between said bars along their entire extent, and the space between said carriage frame top portion and said teeth is great enough to prevent debris from jamming the sliding.

2. The device of claim 1 in which said carriage is supported on said carriage frame by a plurality of wheels which ride on a trackway disposed on said carriage frame and an axle extends between opposed wheels and supports said carriage through bearings.

3. The device of claim 2 in which said means for imparting horizontally reciprocating motion comprises a horizontally reciprocating piston activated by a motor.

4. The device of claim 3 in which said motor uses hydraulic motive means.

5. The device of claim 3 in which said motor uses electrical motive means.

6. The device of claim 3 in which said motor uses compressed air as a motive means.

7. The device of claim 3 in which said horizontally reciprocating motion is constrained by a plurality of limit switches.

* * * * *